US 11,537,152 B2

(12) United States Patent
Ozeki

(10) Patent No.: US 11,537,152 B2
(45) Date of Patent: Dec. 27, 2022

(54) CONTROL VALVE

(71) Applicant: YAMADA MANUFACTURING CO., LTD., Kiryu (JP)

(72) Inventor: Akifumi Ozeki, Kiryu (JP)

(73) Assignee: Yamada Manufacturing Co., Ltd., Kiryu (JP)

( * ) Notice: Subject to any disclaimer, the term of this patent is extended or adjusted under 35 U.S.C. 154(b) by 191 days.

(21) Appl. No.: 17/190,191

(22) Filed: Mar. 2, 2021

(65) Prior Publication Data

US 2021/0294362 A1 Sep. 23, 2021

(30) Foreign Application Priority Data

Mar. 19, 2020 (JP) .............................. JP2020-050175

(51) Int. Cl.
*G05D 23/19* (2006.01)
*G05D 23/27* (2006.01)
*F28F 27/02* (2006.01)
*G05D 23/275* (2006.01)

(52) U.S. Cl.
CPC ......... *G05D 23/1925* (2013.01); *F28F 27/02* (2013.01); *G05D 23/27535* (2013.01)

(58) Field of Classification Search
CPC .......... G05D 23/1925; G05D 23/27535; F28F 27/02
See application file for complete search history.

(56) References Cited

U.S. PATENT DOCUMENTS

| 2018/0119827 A1* | 5/2018 | Ozeki | .................. F16K 27/065 |
| 2018/0119828 A1* | 5/2018 | Ozeki | ................ F16K 11/0856 |
| 2019/0003602 A1* | 1/2019 | Ozeki | ..................... F16K 5/168 |

FOREIGN PATENT DOCUMENTS

JP 2017-133622 8/2017

* cited by examiner

*Primary Examiner* — Marc E Norman
(74) *Attorney, Agent, or Firm* — Rankin, Hill & Clark LLP

(57) ABSTRACT

A control valve includes a casing, a valve body, seal tube members, a fuel passage, and a thermostat. The casing has an inflow port and a plurality of outflow ports. The valve body is rotatably disposed inside the casing, and valve holes are formed in a circumferential wall portion. The seal tube members communicate with the outflow ports, abut an outer circumferential surface of the circumferential wall portion, and are opened and closed by corresponding valve holes. Thermostat opens and closes the fuel passage in response to a detected temperature. A communication groove is formed on an inner circumferential surface of the casing. The communication groove causes the inflow port and an upstream portion of the fuel passage to communicate with each other by partially expanding a gap between the circumferential wall portion and the casing.

4 Claims, 6 Drawing Sheets

CONTROL VALVE

CROSS-REFERENCE TO RELATED APPLICATION

Priority is claimed on Japanese Patent Application No. 2020-050175, filed Mar. 19, 2020, the content of which is incorporated herein by reference.

BACKGROUND OF THE INVENTION

Field of the Invention

The present invention relates to a control valve used for switching a flow channel or the like for vehicle cooling water.

Description of Related Art

In cooling systems for cooling an engine using cooling water, a bypass flow channel bypassing a radiator, an air conditioning flow channel for heating air conditioning air, and the like may also be provided separately from a radiator flow channel circulating between the radiator and the engine. In a cooling system of this kind, a control valve is installed at a branching portion of flow channels, and switching between the flow channels is suitably performed by the control valve. A control valve, in which a valve body having a circumferential wall portion (cylinder wall) is rotatably disposed inside a casing and an arbitrary flow channel is opened and closed in accordance with a rotation position of the valve body, is known (for example, refer to Japanese Unexamined Patent Application, First Publication No. 2017-133622 (hereinafter, Patent Document 1)).

In the control valve disclosed in Patent Document 1, an inflow port for an inflow liquid such as a cooling liquid and as many outflow ports as the number set for discharging the inflow liquid to outside are provided in the casing. A plurality of valve holes for communication between the inside and the outside are formed in the circumferential wall portion of the valve body in a manner of corresponding to the plurality of outflow ports. One end portion side of a cylindrical seal tube member is held at each of the outflow ports in the casing. A valve slide contact surface slidably abutting an outer circumferential surface of the circumferential wall portion of the valve body is provided on the other end portion side of each of the seal tube members. The valve slide contact surface of each of the seal tube members comes into slide contact with the outer circumferential surface of the circumferential wall portion at a position overlapping a rotation path of a corresponding valve hole of the valve body. Each of the seal tube members is opened and closed by a corresponding valve hole on the valve body.

The valve body allows outflow of a liquid from an inward region of the circumferential wall portion to a corresponding outflow port when a seal tube member is at a rotation position where it communicates with a corresponding valve hole, and the valve body blocks outflow of a liquid from the inward region of the circumferential wall portion to a corresponding outflow port when a seal tube member is at a rotation position where it does not communicate with a corresponding valve hole. The rotation position of the valve body is operated by an actuator such as an electric motor.

A fuel passage for communication between the inside of the casing and any of the outflow ports is provided in the casing, and a thermostat for opening and closing the fuel passage in response to a detected temperature is provided in the fuel passage. The thermostat closes the fuel passage during normal times, and it opens the fuel passage such that a liquid inside the casing flows out to outside when the temperature of the liquid inside the casing rises higher than a stipulated temperature. The fuel passage is provided such that it can communicate with a gap between an inner circumferential surface of the casing and the circumferential wall portion of the valve body, and a liquid inside the casing can flow out to outside no matter which rotation position the valve body is at.

SUMMARY OF THE INVENTION

In the control valve disclosed in Patent Document 1, a gap between the inner circumferential surface of the casing and the circumferential wall portion of the valve body serves as a fuel passage. However, when a gap between a circumferential wall of the casing and the circumferential wall portion of the valve body is expanded in order reduce a pressure loss of a liquid inside the casing, the size of the entire casing increases. Regarding a countermeasure to avoid this increase in size, it is conceivable to separately provide a passage dedicated for fuel outside. However, in this case, a structure becomes complicated due to the dedicated passage provided outside, and thus miniaturization of the entire control valve cannot be sufficiently achieved.

Aspects according to the present invention have been made in consideration of the foregoing problems, and an object thereof is to provide a control valve in which a pressure loss of a liquid can be reduced in a liquid circulation portion for fuel and simplification of a structure and miniaturization of the entire device can be achieved.

In order to solve the foregoing problems and achieve the object, the present invention employs the following aspects.

(1) According to an aspect of the present invention, there is provided a control valve including a casing which has an inflow port for a liquid flowing in from outside and a plurality of outflow ports for causing a liquid that has flowed into an inside to flow out to outside, a valve body which is rotatably disposed inside the casing and in which valve holes are formed in a circumferential wall portion, seal tube members of which one end portion communicates with any of the outflow ports and of which the other end portion abuts an outer circumferential surface of the circumferential wall portion and is opened and closed by the corresponding valve hole, a fuel passage which causes the inside of the casing and any of the outflow ports to communicate with each other, and a thermostat which opens and closes the fuel passage in response to a detected temperature. A communication groove for causing the inflow port and an upstream portion of the thermostat in the fuel passage to communicate with each other is formed on an inner circumferential surface of the casing by partially expanding a gap between the circumferential wall portion and the casing.

According to the foregoing aspect (1), if a temperature of a liquid around the thermostat becomes higher than a stipulated temperature, the thermostat detects the temperature rise and opens the fuel passage. Accordingly, a liquid inside the casing flows out to outside through the outflow port. At this time, a liquid inside the casing flows into the fuel passage through the communication groove which is formed by partially expanding a gap between the circumferential wall portion of the valve body and the casing. Since the communication groove is not made by expanding the entire gap between the circumferential wall portion of the valve body and the casing, increase in size of the casing can be avoided. Compared to a case in which an inflow passage dedicated for fuel is provided outside the casing, simplification of the structure and miniaturization of the entire device can be achieved.

(2) In the foregoing aspect (1), any of the valve holes may be formed in the circumferential wall portion to face the communication groove when the valve body is at a rotation position where all the seal tube members are closed.

According to the foregoing aspect (2), when all the seal tube members are closed by the valve body, a liquid flows into the communication groove from an inward side of the circumferential wall portion through the valve hole facing the communication groove. Therefore, when this constitution is employed, a liquid can efficiently flow out to the fuel passage from the outward side and the inward side of the circumferential wall portion, and thus a pressure loss of a liquid can be further reduced.

(3) In the foregoing aspect (1) or (2), any of the outflow ports for a liquid inside the casing flowing out regardless of a turning position of the valve body may be disposed in the vicinity of an upstream side of the thermostat in the fuel passage.

According to the foregoing aspect (3), the thermostat is disposed in the vicinity of the outflow port through which a liquid inside the casing flows at all times, and thus the thermostat can accurately detect a standard temperature (a temperature of a part where no local temperature rise occurs due to retention or the like) of a liquid that has flowed into the casing.

(4) In any one of the foregoing aspects (1) to (3), the communication groove may be formed on the inner circumferential surface of the casing in an axial direction of the circumferential wall portion toward a side where the inflow port is disposed.

According to the foregoing aspect (4), a liquid can smoothly flow to the fuel passage from the inflow port side through the communication groove extending in the axial direction.

According to the aspect of the present invention, the communication groove for causing the inflow port and the upstream portion of the thermostat in the fuel passage to communicate with each other is formed by partially expanding a gap between the circumferential wall portion of the valve body and the casing. For this reason, a pressure loss of a liquid in a liquid circulation portion for fuel can be reduced, and simplification of the structure and miniaturization of the entire device can be achieved compared to a case in which a dedicated passage for fuel is provided outside.

DETAILED DESCRIPTION OF THE INVENTION

Next, an embodiment of the present invention will be described on the basis of the drawings. In the present embodiment, a control valve is employed in a liquid distribution system of a vehicle, in which a cooling liquid for cooling an engine is distributed and supplied to a radiator and other equipment.

[Liquid Distribution System]

Figure 1:
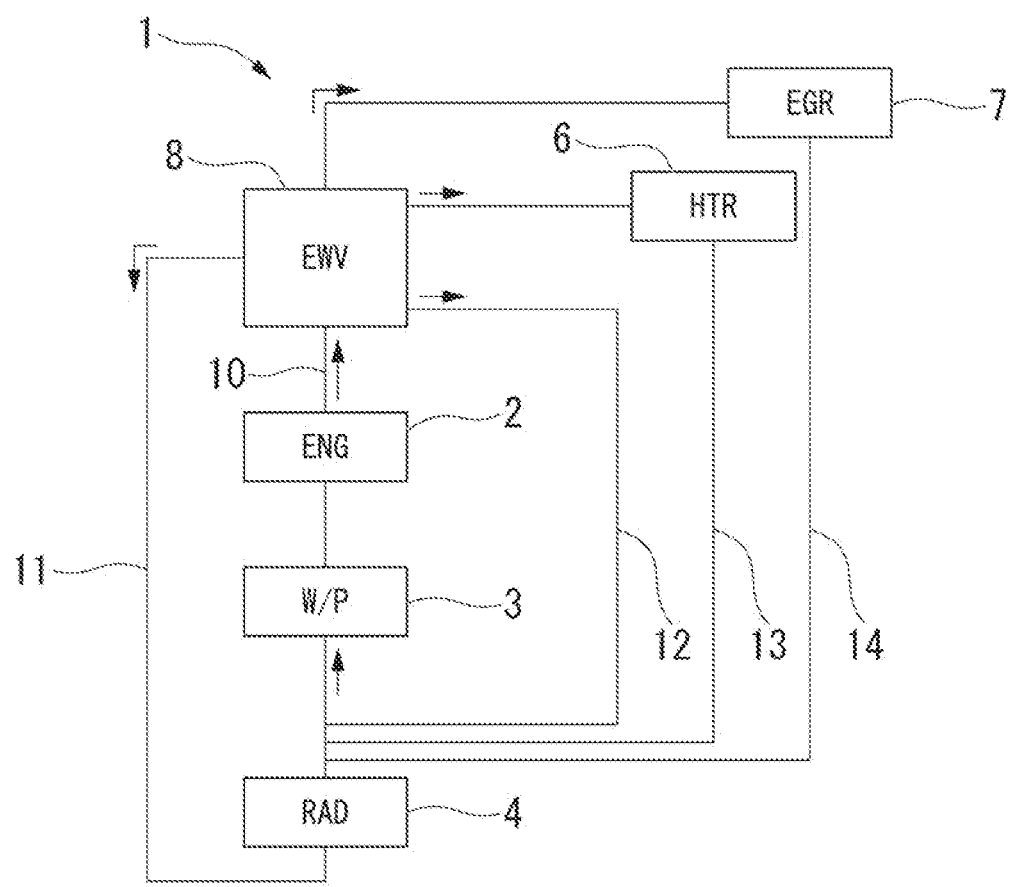
FIG. 1 is a block diagram of a liquid distribution system of an embodiment.

FIG. 1 is a block diagram of a liquid distribution system 1.

As illustrated in FIG. 1, the liquid distribution system 1 is mounted in a vehicle equipped with at least an engine as a vehicle driving source. A vehicle may be a hybrid vehicle, a plug-in hybrid vehicle, or the like in addition to a vehicle having only an engine.

The liquid distribution system 1 has a constitution in which an engine 2 (ENG), a water pump 3 (W/P), a radiator 4 (RAD), a heater core 6 (HTR), an EGR cooler 7 (EGR) and a control valve 8 (EWV) are connected to each other through various flow channels 10 to 14.

The water pump 3, the engine 2, and the control valve 8 are connected in sequence from an upstream side to a downstream side on a main flow channel 10. In the main flow channel 10, a cooling liquid (liquid) passes through the engine 2 and the control valve 8 in sequence in response to operation of the water pump 3.

Each of a radiator flow channel 11, a bypass flow channel 12, an air conditioning flow channel 13, and an EGR flow channel 14 is connected to the main flow channel 10. The radiator flow channel 11, the bypass flow channel 12, the air conditioning flow channel 13, and the EGR flow channel 14 connect an upstream part of the water pump 3 and the control valve 8 to each other in the main flow channel 10.

The radiator 4 is connected to the radiator flow channel 11. In the radiator flow channel 11, heat exchange is performed in the radiator 4 between the cooling liquid and outside air. In the bypass flow channel 12, the cooling liquid that has passed through the control valve 8 bypasses the radiator 4 (the radiator flow channel 11) and returns to the upstream part of the water pump 3.

The heater core 6 is connected to the air conditioning flow channel 13. For example, the heater core 6 is provided inside a duct (not illustrated) of an air conditioning device. In the air conditioning flow channel 13, heat exchange is performed in the heater core 6 between the cooling liquid and air conditioning air circulating inside the duct.

The EGR cooler 7 is connected to the EGR flow channel 14. In the EGR flow channel 14, heat exchange is performed in the EGR cooler 7 between the cooling liquid and EGR gas.

In the liquid distribution system 1 described above, the cooling liquid that has passed through the engine 2 in the main flow channel 10 flows into the control valve 8 and then it is selectively distributed to the various flow channels 11 to 13 in response to operation of the control valve 8.

[Control Valve]

Figure 2:
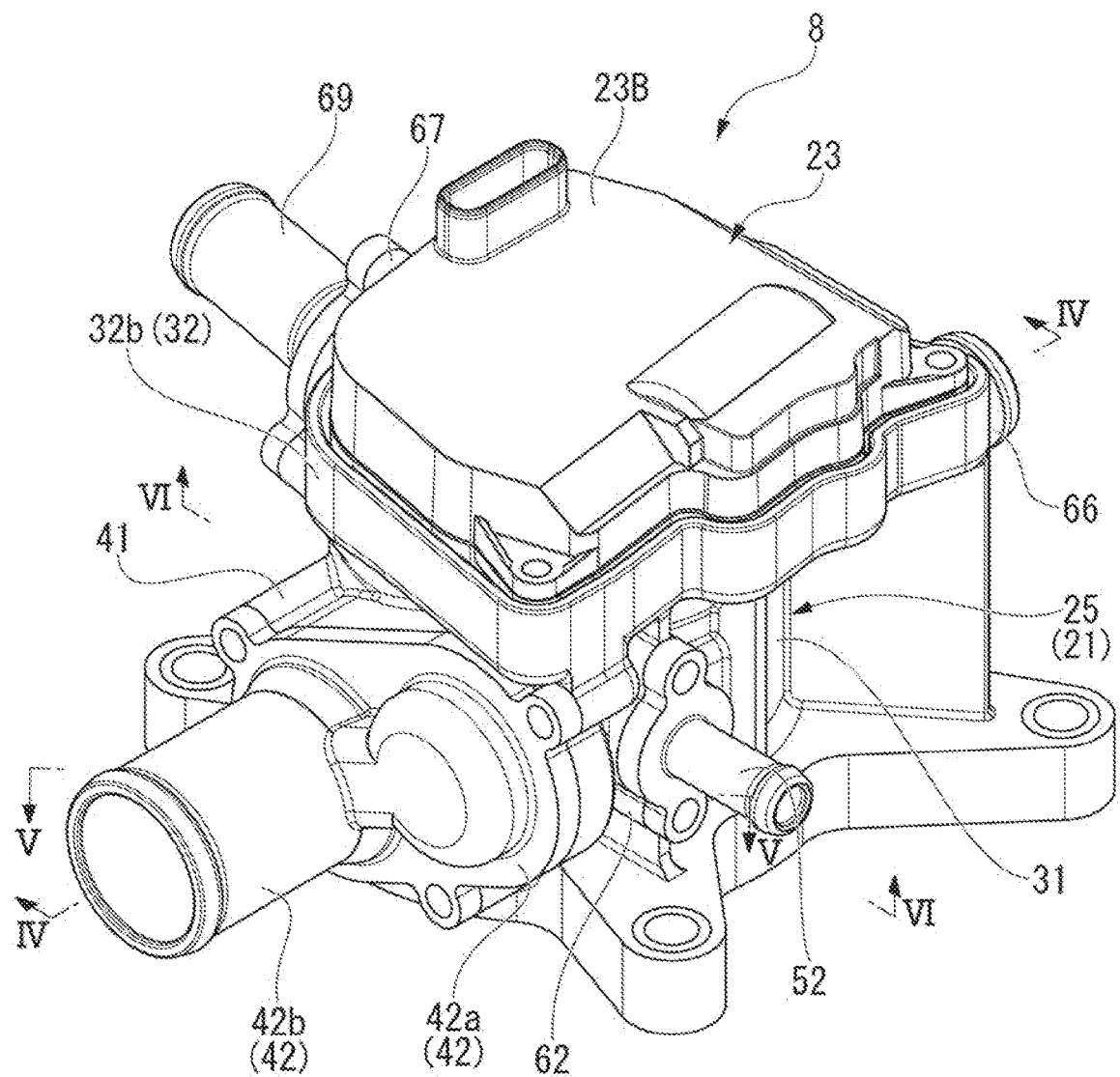
FIG. 2 is a perspective view of a control valve of the embodiment.
Figure 3:
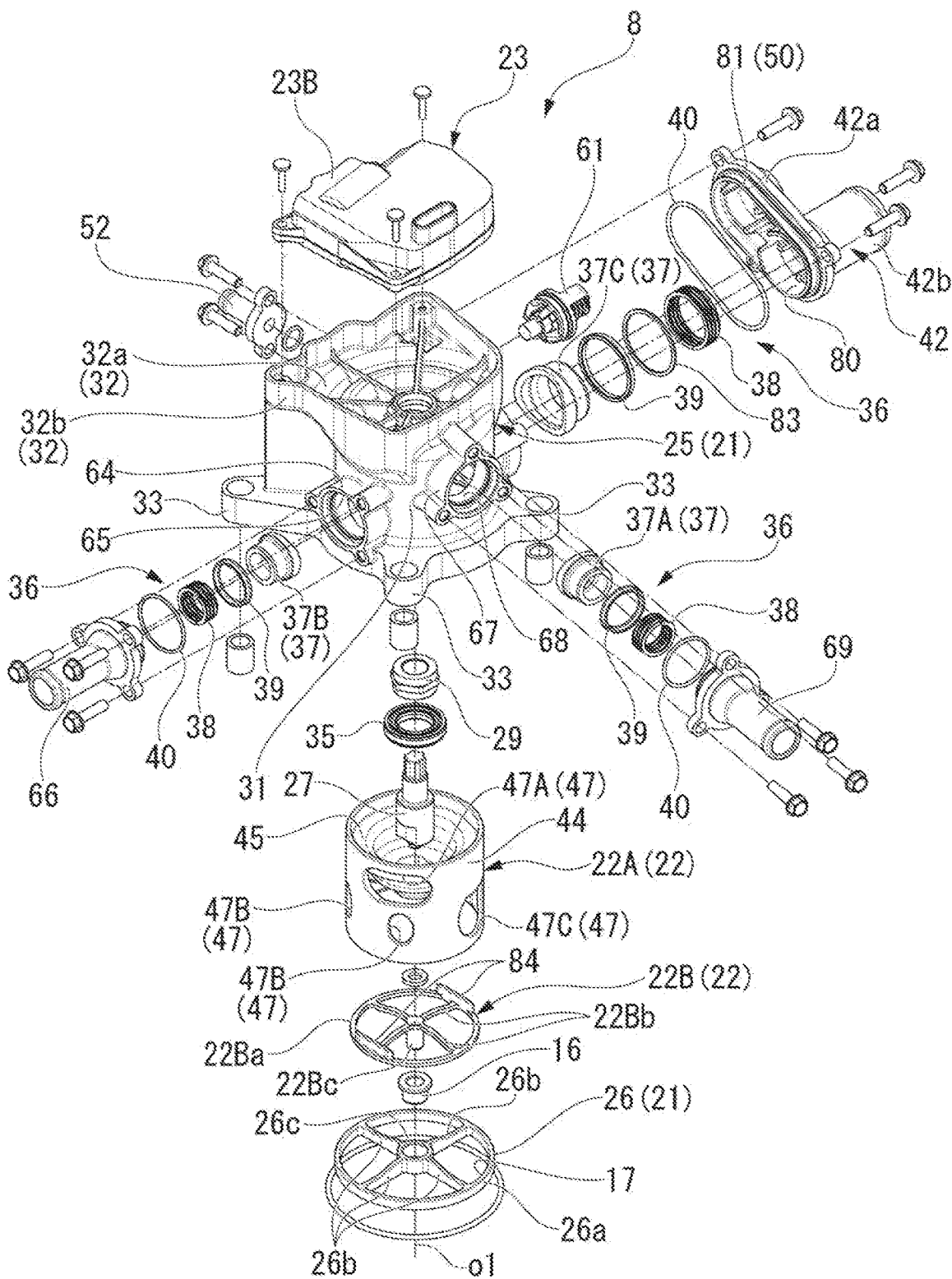
FIG. 3 is an exploded perspective view of the control valve of the embodiment.
Figure 4:
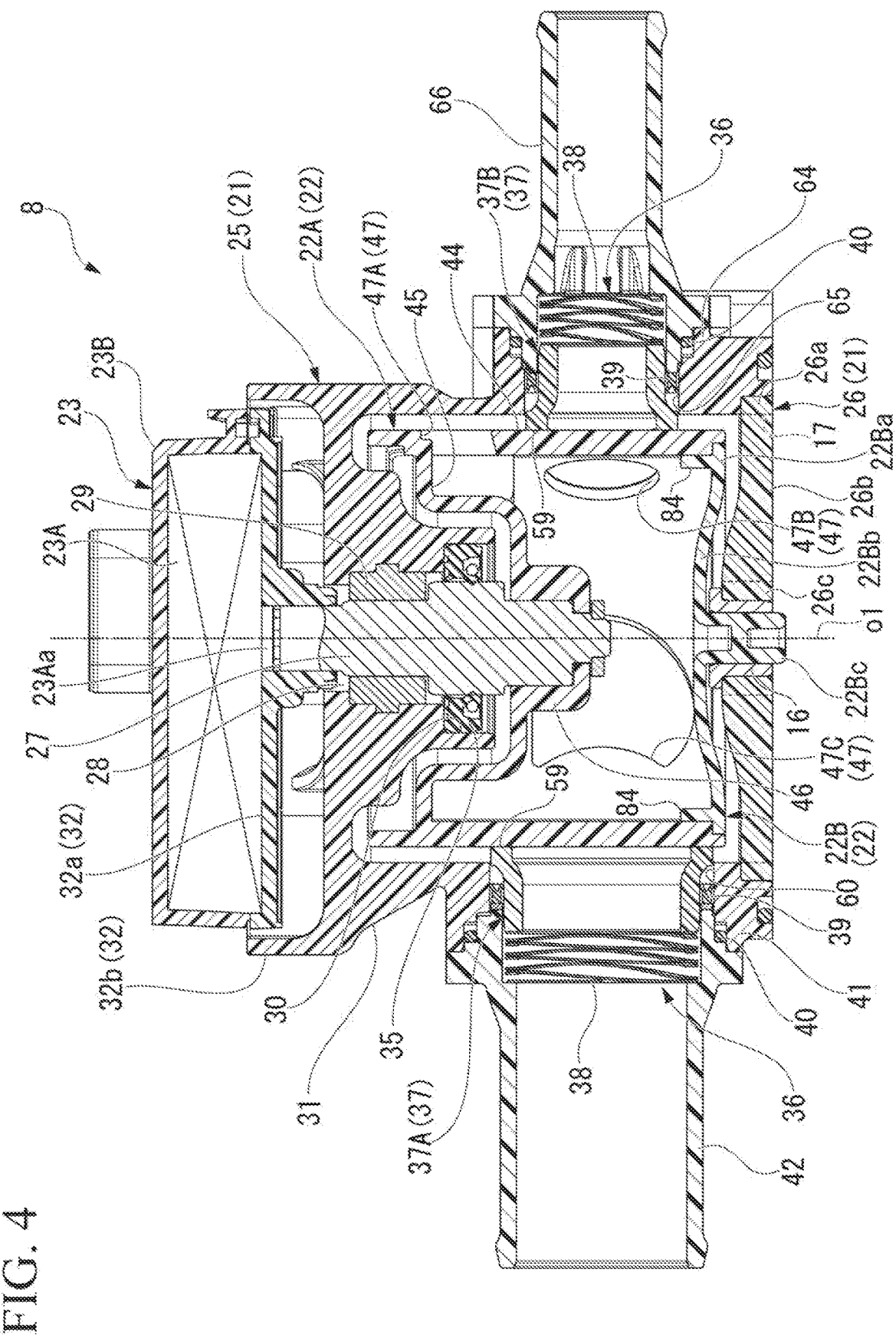
FIG. 4 is a cross-sectional view of the control valve of the embodiment along line IV-IV in FIG. 2.
Figure 5:
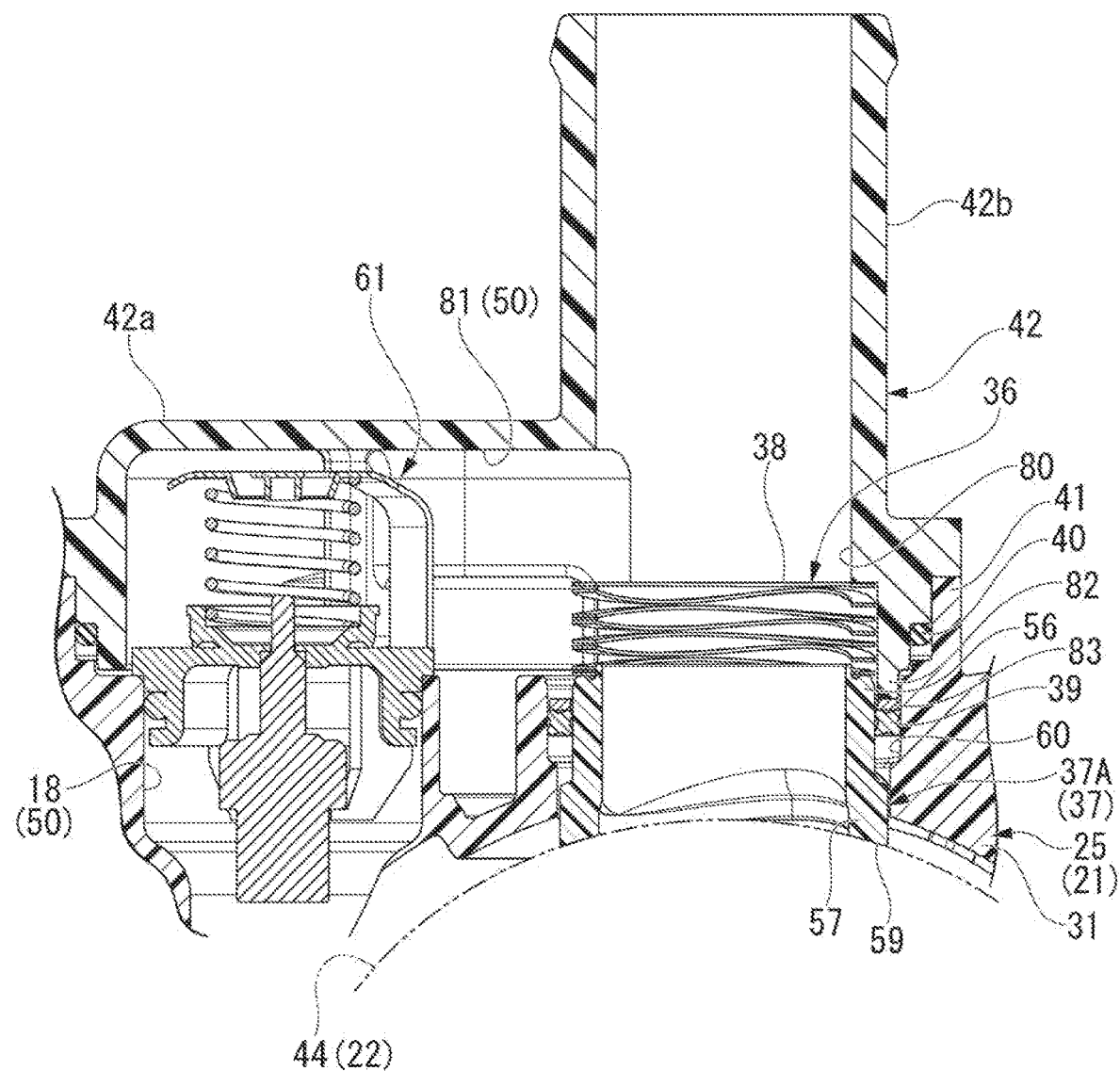
FIG. 5 is a cross-sectional view of the control valve of the embodiment along line V-V in FIG. 2.
Figure 6:
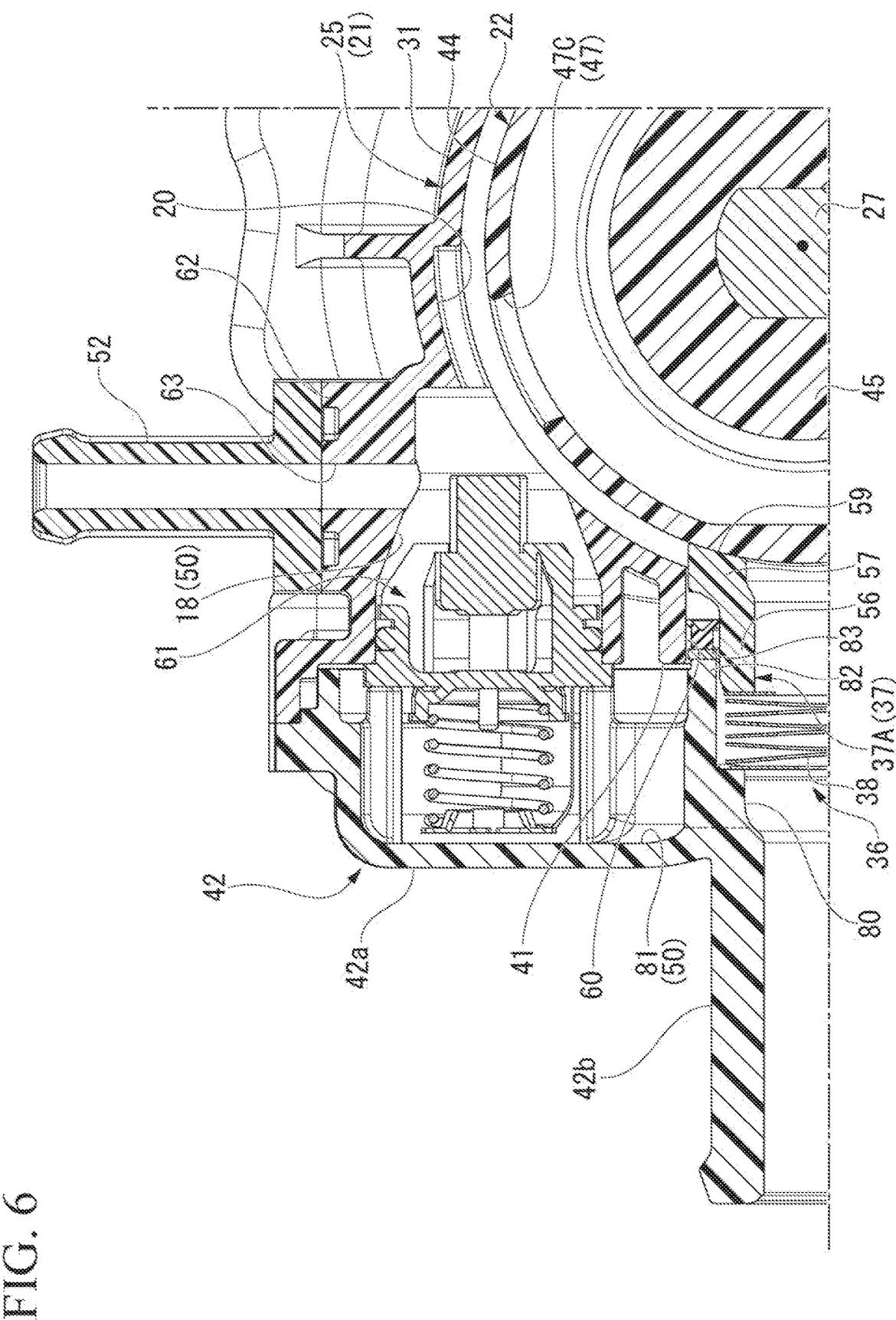
FIG. 6 is a cross-sectional view of the control valve of the embodiment along line VI-VI in FIG. 2.

FIG. 2 is a perspective view of the control valve 8, and FIG. 3 is an exploded perspective view of the control valve 8. FIG. 4 is a cross-sectional view of the control valve 8 along line IV-IV in FIG. 2, and FIG. 5 is a cross-sectional view of the control valve 8 along line V-V in FIG. 2. FIG. 6 is a cross-sectional view of the control valve 8 along line VI-VI in FIG. 2.

As illustrated in these diagrams, the control valve 8 mainly includes a casing 21, a valve body 22, and a drive unit 23.

[Casing]

The casing 21 has a casing main body 25 having a bottomed tubular shape, and an end portion cover 26 attached to an end portion of the casing main body 25 on an opening side. The valve body 22 is rotatably accommodated inside the casing 21. In the casing 21, an axis that coincides with a rotation center axis of the valve body 22 will be referred to as an axis O1 of the casing 21. In the following description, a direction along the axis O1 of the casing 21 will be simply referred to as a case axial direction. In the case axial direction, a side toward an end portion wall 32 that is a bottom wall of the casing main body 25 with respect to a case circumferential wall 31 of the casing main body 25 will be referred to as one end side in the case axial direction, and a side toward the end portion cover 26 with respect to the case circumferential wall 31 of the casing main body 25 will be referred to as the other end side in the case axial direction. Moreover, a direction orthogonal to the axis O1 of the casing 21 will be referred to as a case radial direction.

The casing main body 25 is integrally formed of a resin material. A plurality of attachment pieces 33 extend at an end portion of the substantially cylindrical case circumferential wall 31 of the casing main body 25 on the other end side in the case axial direction. The control valve 8 is fixed to an engine block (not illustrated) or the like via the attachment pieces 33.

In the end portion cover 26 of the casing 21, a boss portion 26c is disposed at an axial center position of a toric framework 26a. The boss portion 26c is supported by a plurality of spoke portions 26b in the framework 26a. A cylindrical slide bearing 16 is attached to the boss portion 26c. In the end portion cover 26, opening parts surrounded by the framework 26a, the boss portion 26c, and adjacent spoke portions 26b serve as inflow ports 17 for the cooling liquid flowing into the casing 21. The inflow ports 17 are connected to the downstream side of the engine 2 in the main flow channel 10 (refer to FIG. 1) of the liquid distribution system 1. Similar to the casing main body 25, the end portion cover 26 is formed of a resin material.

A radiator port 41 (refer to FIG. 4) protruding outward in the case radial direction is formed in the case circumferential wall 31 of the casing main body 25. In the radiator port 41, a fuel opening 18 (refer to FIGS. 5 and 6) and a radiator outflow port 60 (outflow port) are formed side by side in a direction intersecting the case axial direction. Each of the fuel opening 18 and the radiator outflow port 60 penetrates the radiator port 41 in a state of being arranged parallel to each other. The radiator outflow port 60 formed at a position biased to the other end side of the case circumferential wall 31 in the case axial direction, and the fuel opening 18 is formed on one end side of the case circumferential wall 31 in the case axial direction from the radiator outflow port 60. The radiator outflow port 60 and the radiator port 41 in which the fuel opening 18 is formed are formed to have an oval shape in a front view.

A radiator joint 42 is connected to an end surface of the radiator port 41 on the opening side. The radiator joint 42 has a joint base portion 42a having an oval shape in a front view overlapping an end surface of the radiator port 41 having an oval shape, and a joint tube portion 42b projecting outward in the case radial direction from one end portion side of the joint base portion 42a in a longitudinal direction (a side where the radiator outflow port 60 is disposed). A space between the radiator port 41 and the joint base portion 42a is sealed by a seal ring 40.

An outflow passage 80 connecting the radiator outflow port 60 of the radiator port 41 and the joint tube portion 42b to each other is formed inside one end portion side of the joint base portion 42a in the longitudinal direction. The radiator outflow port 60 of the radiator port 41, the outflow passage 80, and an internal passage of the joint tube portion 42b are formed to be connected to each other substantially in a straight manner.

A communication path 81 for causing the fuel opening 18 of the radiator port 41 and a middle portion of the outflow passage 80 to communicate with each other is formed inside the other end portion side of the joint base portion 42a in the longitudinal direction. In the present embodiment, the fuel opening 18 and the communication path 81 constitute a fuel passage 50. A thermostat 61 is attached to the fuel opening 18 such that a part thereof straddles the fuel opening 18 inside the communication path 81.

The thermostat 61 opens and closes the fuel passage 50 in accordance with a temperature of the cooling liquid flowing inside the casing 21. The thermostat 61 closes the fuel passage 50 during normal times, and if the temperature of the cooling liquid therearound rises higher than a stipulated temperature, the thermostat 61 detects the temperature and opens the fuel passage 50. When the fuel passage 50 is opened, the cooling liquid that has flowed into the fuel opening 18 flows out to outside from the joint tube portion 42b via the outflow passage 80 inside the joint base portion 42a. The joint tube portion 42b is connected to an upstream end portion of the radiator flow channel 11 (refer to FIG. 1). Therefore, the cooling liquid that has flowed into the joint tube portion 42b from the fuel passage 50 flows out to the radiator flow channel 11.

A seal mechanism 36 is provided in the radiator outflow port 60. The seal mechanism 36 includes a seal tube member 37, a biasing member 38, and a seal member 39. In the seal tube member 37, one end portion in the axial direction communicates with the outflow passage 80 of the radiator joint 42 and the other end portion in the axial direction is opened and closed by the valve body 22, which will be described below. The seal tube member 37 is formed to have a stepped cylindrical shape including a first tube portion 56 having a small diameter and a second tube portion 57 having a large diameter. In the seal tube member 37, the first tube portion 56 side communicates with the outflow passage 80, and an annular end surface of the second tube portion 57 slidably abuts an outer circumferential surface of a circumferential wall portion 44 of the valve body 22. The end surface of the second tube portion 57 is formed to have a curved shape along the shape of the outer circumferential surface of the circumferential wall portion 44 of the valve body 22. The end surface of the second tube portion 57 constitutes a valve slide contact surface 59.

When the seal tube member 37 disposed in the radiator outflow port 60 is distinguished from the seal tube members 37 disposed in other parts, it will be referred to as a third seal tube member 37C.

The seal member 39 is constituted of an X seal, a Y seal, or the like having an annular shape and seals a space between the radiator outflow port 60 of the radiator port 41 and the outer circumferential surface of the seal tube member 37. On the radiator joint 42 side of the seal member 39, displacement thereof is restricted by a substantially cylindrical support wall 82 protruding in the joint base portion 42a. However, since the communication path 81 for causing the fuel opening 18 and the outflow passage 80 to communicate with each other is formed inside the joint base portion 42a, a part of the substantially cylindrical support wall 82 is divided by the communication path 81. For this reason, in the seal mechanism 36 used in the radiator outflow port 60, a holding ring 83 is disposed on the back portion side (the radiator joint 42 side) of the seal member 39. For example, the holding ring 83 is constituted of a toric plate member formed of a metal, a rigid resin, or the like.

As illustrated in FIGS. 2 and 6, in the case circumferential wall 31, an EGR port 62 is formed at a position adjacent to the radiator port 41 in a circumferential direction (a position close to an accommodation portion of the thermostat 61). The EGR port 62 is formed in the case circumferential wall 31 in a manner of protruding outward in the case radial direction. An EGR outflow port 63 communicating with an upstream side part from the thermostat 61 inside the accommodation portion (the fuel opening 18) of the thermostat 61 is formed in the EGR port 62. The cooling liquid inside the casing 21 flows out through the EGR outflow port 63 via a part in the vicinity of the upstream side of the thermostat 61 of the fuel opening 18. A structure on the upstream side from the thermostat 61 of the fuel opening 18 will be described below in detail. An EGR joint 52 is connected to an opening end surface of the EGR port 62. The EGR joint 52 connects the EGR outflow port 63 and the upstream end portion of the EGR flow channel 14 (refer to FIG. 1) to each other.

In the case circumferential wall 31, a bypass port 64 protruding outward in the case radial direction is formed at an outer circumferential position facing the radiator port 41. A bypass outflow port 65 (outflow port) penetrating the bypass port 64 in the case radial direction is formed in the bypass port 64. The bypass outflow port 65 is formed at a position facing the radiator outflow port 60 with the axis O1 of the casing 21 interposed therebetween. Similar to the radiator outflow port 60, the bypass outflow port 65 is formed at a position biased to the other end side of the case circumferential wall 31 in the case axial direction.

A bypass joint 66 is connected to the opening end surface of the bypass port 64. The bypass joint 66 connects the bypass outflow port 65 and the upstream end portion of the bypass flow channel 12 (refer to FIG. 1) to each other. A seal mechanism 36 similar to that provided in the radiator outflow port 60 is provided in the bypass outflow port 65. However, the seal mechanism 36 provided in the bypass outflow port 65 does not include the holding ring 83 for holding the seal member 39. In the seal tube member 37 of the seal mechanism 36 provided in the bypass outflow port 65, one end portion in the axial direction communicates with the inside of the bypass outflow port 65 (the downstream side of the bypass outflow port 65), and the other end portion in the axial direction is opened and closed by the valve body 22.

When the seal tube member 37 disposed in the bypass outflow port 65 is distinguished from the seal tube members 37 disposed in other parts, it will be referred to as a second seal tube member 37B.

In the case circumferential wall 31, an air conditioning port 67 protruding outward in the case radial direction is formed at the outer circumferential position interposed between the radiator port 41 and the bypass port 64. An air conditioning outflow port 68 penetrating the air conditioning port 67 in the case radial direction is formed in the air conditioning port 67. An air conditioning joint 69 is connected to the opening end surface of the air conditioning port 67. The air conditioning joint 69 connects the air conditioning outflow port 68 and the upstream end portion of the air conditioning flow channel 13 (refer to FIG. 1) to each other. The seal mechanism 36 similar to that provided in the bypass outflow port 65 is provided in the air conditioning outflow port 68. In the seal tube member 37 of this seal mechanism 36, one end portion in the axial direction communicates the inside of the air conditioning outflow port 68 (the downstream side of the air conditioning outflow port 68), and the other end portion in the axial direction is opened and closed by the valve body 22.

When the seal tube member 37 disposed in the air conditioning outflow port 68 is distinguished from the seal tube members 37 disposed in other parts, it will be referred to as a first seal tube member 37A.

[Drive Unit]

The drive unit 23 is attached to the end portion wall 32 of the casing main body 25. As illustrated in FIG. 4, the end portion wall 32 has an end portion wall main body 32a blocking the end surface of the case circumferential wall 31 on one end side in the case axial direction, and a surrounding wall 32b projecting from an outer circumferential edge portion of the end portion wall main body 32a to one end side in the case axial direction. The drive unit 23 has a part accommodated on the inward side of the surrounding wall 32b and is fixed to the end portion wall 32 in this state through bolt-fastening or the like.

The drive unit 23 includes a unit main body 23A constituted of a motor, a deceleration mechanism, a control substrate, and the like, and a unit case 23B accommodating the unit main body 23A. An output shaft 23Aa of the unit main body 23A penetrates the unit case 23B and projects to outside. A drive shaft 27 (separate body) is integrally coupled to the output shaft 23Aa. The drive shaft 27 penetrates a shaft hole 28 formed in the end portion wall main body 32a of the casing 21 and is coupled to an axis center portion of the valve body 22, which will be described below. The drive shaft 27 is disposed axially with the axis O1 of the casing 21.

In the end portion wall main body 32a of the casing 21, the thickness on a side facing the inside of the case circumferential wall 31 increases from a circumferential edge portion toward a center region (a region formed in the shaft hole 28). That is, a protrusion part protruding in the inward direction of the circumferential wall portion 44 of the valve body 22 is formed on a side facing the inside of the case circumferential wall 31 of the end portion wall main body 32a. The shaft hole 28 is formed to penetrate the thickest part of the end portion wall main body 32a in the case axial direction. A cylindrical slide bearing 29 for slidably supporting the outer circumferential surface of the drive shaft 27 is held inside the shaft hole 28. A diameter expanded groove 30 having an inner diameter larger than inner circumferential surfaces of other parts in the shaft hole 28 is formed at an end edge of the shaft hole 28 on the valve body 22 side. A seal ring 35 for preventing leakage of the cooling liquid from the inside of the casing main body 25 to the drive unit 23 side is attached to the inside of the diameter expanded groove 30 in a manner of slidably coming into tight contact with the outer circumferential surface of the drive shaft 27.

[Valve Body]

The valve body 22 is rotatably disposed inside the casing 21. The valve body 22 includes a main body block 22A having a bottomed cylindrical shape, and an end portion plate 22B attached to the end portion of the main body block 22A on the opening side in the axial direction. The main body block 22A includes the cylindrical circumferential wall portion 44, a coupling wall 45 extending inward in the radial direction from a position near one end portion of the circumferential wall portion 44 in the case axial direction, and a substantially tubular coupling tube portion 46 connected to the end portion of the coupling wall 45 on a side inward in the radial direction. The circumferential wall portion 44, the coupling wall 45, and the coupling tube portion 46 are integrally formed of a resin material.

The end portion plate 22B has a toric framework 22Ba, a pivotal support shaft 22Bc disposed at the axial center position of the framework 22Ba, and a plurality of spoke portions 22Bb coupled to the framework 22Ba, and the pivotal support shaft 22Bc is supported by the plurality of spoke portions 22Bb. The framework 22Ba, the spoke portions 22Bb, and the pivotal support shaft 22Bc are integrally formed of a resin material. A pair of locking pieces 84 protrude at two positions separated from each other in the circumferential direction of the framework 22Ba. The end portion plate 22B has the framework 22Ba fitted to the inner circumferential surface of the circumferential wall portion 44 on the main body block 22A side and is fixed to the main body block 22A in this state through bonding, screwing, or the like. At this time, the pair of locking pieces 84 are engaged with a flat interlocking surface (not illustrated) formed on the inner circumferential surface of the circumferential wall portion 44. Accordingly, the end portion plate 22B is locked with respect to the main body block 22A. The pivotal support shaft 22Bc of the end portion plate 22B is rotatably supported by a slide bearing 16 held in the end portion cover 26 of the casing 21.

The coupling tube portion 46 of the main body block 22A is integrally coupled to the drive shaft 27. A plurality of valve holes 47 which can respectively communicate with the air conditioning outflow port 68, the bypass outflow port 65, and the radiator outflow port 60 described above are formed in the circumferential wall portion 44 of the main body block 22A. Each of the valve holes 47 penetrates the circumferential wall portion 44 in the case radial direction.

Hereinafter, the valve hole 47 which can communicate with the air conditioning outflow port 68 will be referred to as a first valve hole 47A, the valve holes 47 which can communicate with the bypass outflow port 65 will be referred to as second valve holes 47B, and the valve holes 47 which can communicate with the radiator outflow port 60 will be referred to as third valve holes 47C.

Only one first valve hole 47A is formed in a region on one end side of the circumferential wall portion 44 in the case axial direction (near one end portion of the circumferential wall portion 44 in the axial direction). The first valve hole 47A is formed to have a long hole shape lying in the circumferential direction of the circumferential wall portion 44. When the valve body 22 is in a predetermined turning range, the first valve hole 47A allows an inner space of the circumferential wall portion 44 of the valve body 22 and the air conditioning outflow port 68 to communicate with each other. In the first valve hole 47A, a width in a direction extending in the axial direction of the circumferential wall portion 44 is set to be narrower than those of the second valve holes 47B and the third valve holes 47C.

Two second valve holes 47B are formed separately from each other in the circumferential direction in a region on the other end side of the circumferential wall portion 44 in the case axial direction (near the other end portion of the circumferential wall portion 44 in the axial direction). Two third valve holes 47C are formed separately from each other in the circumferential direction in a region on the other end side of the circumferential wall portion 44 in the case axial direction (near the other end portion of the circumferential wall portion 44 in the axial direction). The second valve holes 47B and the third valve holes 47C are formed in regions substantially overlapping each other in the axial direction on the circumferential wall portion 44. The second valve holes 47B and the third valve holes 47C are formed in regions not overlapping the first valve hole 47A in the axial direction on the circumferential wall portion 44 (regions separated from each other in the axial direction). The shapes of the second valve holes 47B and the third valve holes 47C are arbitrary, such as perfect circle shapes, elliptical shapes, or rectangular shapes. However, regarding the width of the circumferential wall portion 44 in a direction extending in the axial direction, the third valve holes 47C which can communicate with the radiator outflow port 60 are larger than the second valve holes 47B.

[Liquid Circulation Portion for Fuel]

As illustrated in FIG. 6, on the inner circumferential surface of the case circumferential wall 31 of the casing 21, a communication groove 20 recessed into a hollow shape outward in the radial direction is formed at a position leads to the end portion of the fuel opening 18 on a side inward in the radial direction. The communication groove 20 continuously extends from a position communicating with the fuel opening 18 to the end portion in the axial direction on a side facing the inflow ports 17. The width of the communication groove 20 in the circumferential direction of the case circumferential wall 31 is a uniform width throughout the entire area in the axial direction. It is desirable that the width of this communication groove 20 be a width within a range of 30° to 45° in angle conversion in the circumferential direction of the case circumferential wall 31. The communication groove 20 partially expands a gap with respect to the outer circumferential surface of the valve body 22 (the circumferential wall portion 44) and increases a circulation volume of the cooling liquid inside the casing 21 toward the fuel passage 50 (toward an upstream portion of the thermostat 61).

During a state in which the circumferential wall portion 44 closes all of the first seal tube member 37A, the second seal tube member 37B, and the third seal tube member 37C, as illustrated in FIG. 6, one of the two third valve holes 47C in the circumferential wall portion 44 is formed to face the communication groove 20. For this reason, when all the seal tube members 37 are closed by the valve body 22, the cooling liquid efficiently flows into the communication groove 20 from the inward side of the circumferential wall portion 44 through the third valve holes 47C facing the communication groove 20.

[Operation of Control Valve]

Next, operation of the foregoing control valve 8 will be described.

As illustrated in FIG. 1, in the main flow channel 10, the cooling liquid sent out by the water pump 3 is subjected to heat exchange in the engine 2 and then circulates toward the control valve 8. The cooling liquid that has passed through the engine 2 in the main flow channel 10 flows into the casing 21 of the control valve 8 through the inflow ports 17.

In the cooling liquid that has flowed into the casing 21 of the control valve 8, a part of the cooling liquid flows into the EGR outflow port 63. The cooling liquid that has flowed into the EGR outflow port 63 is supplied to the inside of the EGR flow channel 14 through the EGR joint 52. The cooling liquid that has been supplied to the inside of the EGR flow channel 14 is subjected to heat exchange between the cooling liquid and the EGR gas in the EGR cooler 7 and then returns to the main flow channel 10.

On the other hand, in the cooling liquid that has flowed into the casing 21 of the control valve 8, the cooling liquid that has not flowed into the EGR outflow port 63 is distributed to each of the flow channels 11 to 13 through any of the outflow ports (the radiator outflow port 60, the bypass outflow port 65, and the air conditioning outflow port 68)

opened by the valve body 22 in accordance with a rotation position of the valve body 22 inside the casing 21.

In the control valve 8, in order to switch a communication pattern between the valve holes and the outflow ports, the valve body 22 is rotated around the axis O1 by the drive unit 23. Further, a valve hole and an outflow port communicate with each other in a communication pattern corresponding to a stop position of the valve body 22 by stopping rotation of the valve body 22 at a position corresponding to a communication pattern desired to be set.

In a state in which the seal tube member 37 (the third seal tube member 37C) of the radiator outflow port 60 is closed by the valve body 22, if the temperature of the cooling liquid in the vicinity of the thermostat 61 inside the casing 21 rises higher than the stipulated temperature, the thermostat 61 opens the fuel passage 50, and the cooling liquid inside the casing 21 flows out to the radiator flow channel 11. Accordingly, an excessive temperature rise of the cooling liquid distributed from the control valve 8 is curbed.

Effects of Embodiment

As above, in the control valve 8 of the present embodiment, the communication groove 20 is formed on the inner circumferential surface of the circumferential wall portion 44 such that the gap between the circumferential wall portion 44 of the valve body 22 and the casing 21 is partially expanded. Further, the communication groove 20 causes the inflow ports 17 of the casing 21 and the upstream part of the thermostat 61 in the fuel passage 50 to communicate with each other. In the control valve 8 of the present embodiment, being different from the case in which the gap between the circumferential wall portion 44 of the valve body 22 and the casing 21 is expanded in the entire area, increase in size of the entire device can be avoided, and a pressure loss when the cooling liquid flows to the fuel passage 50 can be curbed. Compared to the case in which a dedicated fuel passage is provided outside the casing 21, miniaturization and simplification of the structure can be achieved.

In the control valve 8 of the present embodiment, the communication groove 20 is formed on the inner circumferential surface of the casing 21 where the thickness is easily ensured, and thus a cross section of the communication groove 20 can be easily expanded without expanding the width of the communication groove 20.

Moreover, in the control valve 8 of the present embodiment, when the valve body 22 is at a rotation position where all the seal tube members 37 are closed, some valve holes 47 (the third valve holes 47C) are formed to face the communication groove 20. For this reason, the cooling liquid can also flow to the fuel passage 50 from the inward side of the circumferential wall portion 44 through the valve holes 47 (the third valve holes 47C) facing the communication groove 20. Therefore, when the control valve 8 of the present embodiment is employed, the cooling liquid can efficiently flow to the fuel passage 50 from the outward side and the inward side of the circumferential wall portion 44, and a pressure loss of the cooling liquid can be further reduced.

In the control valve 8 of the present embodiment, the outflow port (the EGR outflow port 63) through which the cooling liquid inside the casing 21 flows out at all times regardless of a turning position of the valve body 22 is disposed in the vicinity of the upstream side of the thermostat 61 of the fuel passage 50. For this reason, a flowing cooling liquid is in contact with the thermostat 61 at all times. Therefore, when this constitution is employed, the thermostat 61 can detect an accurate temperature of the cooling liquid in a part where no local temperature rise occurs due to retention or the like.

In the control valve 8 of the present embodiment, the communication groove 20 on the inner circumferential surface of the casing 21 is formed in the axial direction toward the inflow ports 17 side. For this reason, the cooling liquid that has flowed into the casing 21 through the inflow ports 17 can smoothly flow to the fuel passage 50 through the communication groove 20.

The present invention is not limited to the foregoing embodiment, and various design changes can be made within a range not departing from the gist thereof. For example, in the foregoing embodiment, the communication groove 20 is formed on the inner circumferential surface of the casing 21 (the case circumferential wall 31), but the communication groove 20 may be formed on the outer circumferential surface of the circumferential wall portion of the valve body 22.

In the present example, regarding a thermostat, a wax pellet-type thermostat has been described, but a temperature measuring resistor such as bimetal, a shape memory alloy, thermistor, or platinum, or a thermocouple may be adopted.

What is claimed is:

1. A control valve comprising:
   a casing which has an inflow port for a liquid flowing in from outside and a plurality of outflow ports for causing a liquid that has flowed into an inside to flow out to outside;
   a valve body which is rotatably disposed inside the casing and in which valve holes are formed in a circumferential wall portion;
   seal tube members of which one end portion communicates with any of the outflow ports and of which the other end portion abuts an outer circumferential surface of the circumferential wall portion and is opened and closed by the corresponding valve hole;
   a fuel passage which causes the inside of the casing and any of the outflow ports to communicate with each other; and
   a thermostat which opens and closes the fuel passage in response to a detected temperature,
   wherein a communication groove for causing the inflow port and an upstream portion of the thermostat in the fuel passage to communicate with each other is formed on an inner circumferential surface of the casing by partially expanding a gap between the circumferential wall portion and the casing.

2. The control valve according to claim 1,
   wherein any of the valve holes is formed in the circumferential wall portion to face the communication groove when the valve body is at a rotation position where all the seal tube members are closed.

3. The control valve according to claim 1,
   wherein any of the outflow ports for a liquid inside the casing flowing out regardless of a turning position of the valve body is disposed in the vicinity of an upstream side of the thermostat in the fuel passage.

4. The control valve according to claim 1,
   wherein the communication groove is formed on the inner circumferential surface of the casing in an axial direction of the circumferential wall portion toward a side where the inflow port is disposed.

* * * * *